United States Patent
Viteri et al.

(10) Patent No.: US 6,622,470 B2
(45) Date of Patent: Sep. 23, 2003

(54) SEMI-CLOSED BRAYTON CYCLE GAS TURBINE POWER SYSTEMS

(75) Inventors: Fermin Viteri, Sacramento, CA (US); Roger E. Anderson, Gold River, CA (US)

(73) Assignee: Clean Energy Systems, Inc., Rancho Cordova, CA (US)

(*) Notice: Subject to any disclaimer, the term of this patent is extended or adjusted under 35 U.S.C. 154(b) by 0 days.

(21) Appl. No.: 09/855,223

(22) Filed: May 14, 2001

(65) Prior Publication Data

US 2002/0100271 A1 Aug. 1, 2002

Related U.S. Application Data

(60) Provisional application No. 60/203,726, filed on May 12, 2000, and provisional application No. 60/207,530, filed on May 26, 2000.

(51) Int. Cl.[7] .................................................. F02C 3/34
(52) U.S. Cl. ..................................................... 60/39.52
(58) Field of Search ........................... 60/39.52, 39.55, 60/784, 783, 39.46

(56) References Cited

U.S. PATENT DOCUMENTS

| 864,017 | A | 8/1907 | Miller |
|---|---|---|---|
| 886,274 | A | 4/1908 | Tate |
| 1,013,907 | A | 1/1912 | Taylor |
| 1,227,275 | A | 5/1917 | Kraus |
| 1,372,121 | A | 3/1921 | Davis |
| 1,820,755 | A | 8/1931 | McMullen |
| 1,828,784 | A | 10/1931 | Perrin |
| 2,004,317 | A | 6/1935 | Forster |
| 2,033,010 | A | 3/1936 | Russell |
| 2,078,956 | A | 5/1937 | Lysholm |
| 2,168,313 | A | 8/1939 | Bichowsky |
| 2,218,281 | A | 10/1940 | Ridder |
| 2,359,108 | A | 9/1944 | Hoskins |
| 2,368,827 | A | 2/1945 | Hanson |
| 2,374,710 | A | 5/1945 | Smith |
| 2,417,835 | A | 3/1947 | Moore |
| 2,428,136 | A | 9/1947 | Barr |
| 2,469,238 | A | 5/1949 | Newton |
| 2,476,031 | A | 7/1949 | Farkas |
| 2,478,682 | A | 8/1949 | Blackwood |

(List continued on next page.)

FOREIGN PATENT DOCUMENTS

| EP | 86104859.3 | 4/1986 |
|---|---|---|
| EP | 92120907.8 | 12/1992 |
| EP | 94305077.3 | 1/1995 |

(List continued on next page.)

OTHER PUBLICATIONS

Brauser, S. et al.; A Proposed Hydrogen–Oxygen Power Cycle; 1967; Stillwater, Oklahoma.

Reese, R. et al.; A Proposed Hydrogen–Oxygen Fueled Steam Cycle for the Propulsion of Deep Submersibles; 1971; Massachusetts.

(List continued on next page.)

Primary Examiner—Michael Koczo
(74) Attorney, Agent, or Firm—Heisler & Associates

(57) ABSTRACT

A semi-closed combined cycle power system is provided which can also convert an open combined cycle gas turbine into a non-polluting zero emissions power system. The exhaust is not emitted into the atmosphere as with typical open combined cycles, but rather is routed to a divider. The divider splits the exhaust into either a return duct or a separation duct. The return duct routes a portion of the exhaust back to the compressor. Before reaching the compressor, an oxygen duct adds additional oxygen to the exhaust to form a gas mixture which includes and steam from the exhaust and oxygen from the oxygen duct. This gas mixture has characteristics which mimic those of air, so that the compressor need not be modified to effectively compress the gas mixture.

9 Claims, 4 Drawing Sheets

U.S. PATENT DOCUMENTS

| | | |
|---|---|---|
| 2,487,435 A | 11/1949 | Goddard |
| 2,523,656 A | 9/1950 | Goddard |
| 2,547,093 A | 4/1951 | Ray |
| 2,563,028 A | 8/1951 | Goddard |
| 2,568,787 A | 9/1951 | Bosch |
| 2,582,938 A | 1/1952 | Eastman |
| 2,605,610 A | 8/1952 | Hermitte |
| 2,621,475 A * | 12/1952 | Loy .................. 60/39.52 |
| 2,636,345 A | 4/1953 | Zoller |
| 2,654,217 A | 10/1953 | Rettaliata |
| 2,656,677 A | 10/1953 | Peterson |
| 2,662,373 A | 12/1953 | Sherry |
| 2,678,531 A | 5/1954 | Miller |
| 2,678,532 A | 5/1954 | Miller |
| 2,697,482 A | 12/1954 | Blizard |
| 2,717,491 A | 9/1955 | Barr |
| 2,722,100 A | 11/1955 | Goddard |
| 2,763,987 A | 9/1956 | Kretschmer |
| 2,770,097 A | 11/1956 | Walker |
| 2,832,194 A | 4/1958 | Kuhner |
| 2,869,324 A | 1/1959 | Foote |
| 2,884,912 A | 5/1959 | Lewis |
| 2,916,877 A | 12/1959 | Walter |
| 2,986,882 A * | 6/1961 | Pavlecka ............ 60/39.52 |
| 3,038,308 A | 6/1962 | Fuller |
| 3,054,257 A | 9/1962 | Schelp |
| 3,101,592 A | 8/1963 | Robertson |
| 3,134,228 A | 5/1964 | Wolansky |
| 3,183,864 A | 5/1965 | Stengel |
| 3,238,719 A | 3/1966 | Harslem |
| 3,298,176 A | 1/1967 | Forsyth |
| 3,302,596 A | 2/1967 | Zinn |
| 3,315,467 A | 4/1967 | DeWitt |
| 3,331,671 A | 7/1967 | Goodwin |
| 3,335,565 A | 8/1967 | Aguet |
| 3,359,723 A | 12/1967 | Bohensky |
| 3,385,381 A | 5/1968 | Calaman |
| 3,423,028 A | 1/1969 | Stupakis |
| 3,459,953 A | 8/1969 | Hughes |
| 3,559,402 A | 2/1971 | Stone |
| 3,574,507 A | 4/1971 | Kydd |
| 3,608,529 A | 9/1971 | Smith |
| 3,649,469 A | 3/1972 | MacBeth |
| 3,657,879 A | 4/1972 | Ewbank |
| 3,677,239 A | 7/1972 | Elkins |
| 3,693,347 A | 9/1972 | Kydd |
| 3,702,110 A | 11/1972 | Hoffman |
| 3,703,807 A * | 11/1972 | Rice .................. 60/39.52 |
| 3,731,485 A | 5/1973 | Rudolph |
| 3,736,745 A | 6/1973 | Karig |
| 3,738,792 A | 6/1973 | Feng |
| 3,747,336 A | 7/1973 | Dibelius |
| 3,751,906 A | 8/1973 | Leas |
| 3,772,881 A | 11/1973 | Lange |
| 3,779,212 A | 12/1973 | Wagner |
| 3,792,690 A | 2/1974 | Cooper |
| 3,804,579 A | 4/1974 | Wilhelm |
| 3,807,373 A | 4/1974 | Chen |
| 3,826,080 A | 7/1974 | DeCorso |
| 3,831,373 A | 8/1974 | Flynt |
| 3,850,569 A | 11/1974 | Alquist |
| 3,854,283 A | 12/1974 | Stirling |
| 3,862,624 A | 1/1975 | Underwood |
| 3,862,819 A | 1/1975 | Wentworth |
| 3,928,961 A | 12/1975 | Pfefferle |
| 3,972,180 A | 8/1976 | Van Gelder |
| 3,978,661 A | 9/1976 | Cheng |
| 3,980,064 A | 9/1976 | Ariga |
| 3,982,878 A | 9/1976 | Yamane |
| 4,063,414 A | 12/1977 | Sata |
| 4,118,925 A | 10/1978 | Sperry |
| 4,133,171 A * | 1/1979 | Earnest et al. ............ 60/39.52 |
| 4,148,185 A | 4/1979 | Somers |
| 4,193,259 A | 3/1980 | Muenger |
| 4,194,890 A | 3/1980 | McCombs |
| 4,199,327 A | 4/1980 | Hempill |
| 4,224,299 A | 9/1980 | Barber |
| 4,224,991 A | 9/1980 | Sowa |
| 4,249,371 A | 2/1981 | Romeyke |
| 4,271,664 A * | 6/1981 | Earnest .................. 60/39.52 |
| 4,273,743 A | 6/1981 | Barber |
| 4,297,841 A | 11/1981 | Cheng |
| 4,313,300 A | 2/1982 | Wilkes |
| 4,337,618 A | 7/1982 | Hughes |
| 4,377,067 A | 3/1983 | Sternfeld |
| 4,425,755 A | 1/1984 | Hughes |
| 4,426,842 A * | 1/1984 | Collet .................. 60/39.52 |
| 4,434,613 A | 3/1984 | Stahl |
| 4,456,069 A | 6/1984 | Vigneri |
| 4,465,023 A | 8/1984 | Wagner |
| 4,498,289 A | 2/1985 | Osgerby |
| 4,499,721 A | 2/1985 | Cheng |
| 4,509,324 A | 4/1985 | Urbach |
| 4,519,769 A | 5/1985 | Tanaka |
| 4,528,811 A | 7/1985 | Stahl |
| 4,533,314 A | 8/1985 | Herberling |
| 4,549,397 A | 10/1985 | Cheng |
| 4,622,007 A | 11/1986 | Gitman |
| 4,631,914 A | 12/1986 | Hines |
| 4,657,009 A | 4/1987 | Zen |
| 4,674,463 A | 6/1987 | Duckworth |
| 4,680,927 A | 7/1987 | Cheng |
| 4,716,737 A | 1/1988 | Mandrin |
| 4,731,989 A | 3/1988 | Furuya |
| 4,765,143 A | 8/1988 | Crawford |
| 4,825,650 A | 5/1989 | Hosford |
| 4,841,721 A | 6/1989 | Patton |
| 4,845,940 A | 7/1989 | Beer |
| 4,884,529 A | 12/1989 | Byrnes |
| 4,899,537 A | 2/1990 | Cheng |
| 4,910,008 A | 3/1990 | Prudhon |
| 4,916,904 A | 4/1990 | Ramsaier |
| 4,928,478 A | 5/1990 | Maslak |
| 4,942,734 A | 7/1990 | Markbreiter |
| 4,948,055 A | 8/1990 | Belcher |
| 4,982,568 A | 1/1991 | Kalina |
| 4,987,735 A | 1/1991 | DeLong |
| 5,050,375 A | 9/1991 | Dickinson |
| 5,055,030 A | 10/1991 | Schirmer |
| 5,069,031 A | 12/1991 | Shekleton |
| 5,088,450 A | 2/1992 | Sternfeld |
| 5,103,630 A | 4/1992 | Correa |
| 5,131,225 A | 7/1992 | Roettger |
| 5,175,994 A | 1/1993 | Fox |
| 5,175,995 A | 1/1993 | Pak |
| 5,247,791 A | 9/1993 | Pak |
| 5,265,410 A | 11/1993 | Hisatome |
| 5,285,628 A | 2/1994 | Korenberg |
| 5,329,758 A | 7/1994 | Urbach |
| 5,353,589 A | 10/1994 | Althaus |
| 5,363,642 A | 11/1994 | Frutschi |
| 5,417,053 A | 5/1995 | Uji |
| 5,449,568 A | 9/1995 | Micheli |
| RE35,061 E | 10/1995 | Correa |
| 5,479,781 A | 1/1996 | Fric |
| 5,490,377 A | 2/1996 | Janes |
| 5,491,969 A | 2/1996 | Cohn |
| 5,511,971 A | 4/1996 | Benz |
| 5,535,584 A | 7/1996 | Janes |
| 5,541,014 A | 7/1996 | Micheli |
| 5,557,936 A | 9/1996 | Drnevich |

| | | |
|---|---|---|
| 5,572,861 A | 11/1996 | Shao |
| 5,581,997 A | 12/1996 | Janes |
| 5,590,518 A | 1/1997 | Janes |
| 5,617,719 A | 4/1997 | Ginter |
| 5,628,184 A | 5/1997 | Santos |
| 5,636,980 A | 6/1997 | Young |
| 5,678,408 A | 10/1997 | Janes |
| 5,679,134 A | 10/1997 | Brugerolle |
| 5,687,560 A | 11/1997 | Janes |
| 5,709,077 A | 1/1998 | Beichel |
| 5,715,673 A | 2/1998 | Beichel |
| 5,724,805 A | 3/1998 | Golomb |
| 5,761,896 A | 6/1998 | Dowdy |
| 5,802,840 A | 9/1998 | Wolf |
| 5,852,925 A | 12/1998 | Prasad |
| 5,955,039 A | 9/1999 | Dowdy |
| 5,956,937 A | 9/1999 | Beichel |
| 5,970,702 A | 10/1999 | Beichel |
| 5,997,595 A | 12/1999 | Yokohama |
| 6,196,000 B1 | 3/2001 | Fassbender |
| 6,260,348 B1 | 7/2001 | Sugishita |

FOREIGN PATENT DOCUMENTS

| | | |
|---|---|---|
| GB | 6394 | 5/1898 |
| GB | 140516 | 3/1920 |
| GB | 271706 | 5/1927 |
| GB | 2111602 | 7/1983 |
| JP | 06318464 | 11/1994 |
| WO | WO 94/10427 | 5/1994 |
| WO | WO 96/07024 | 3/1996 |
| WO | WO 97/44574 | 11/1997 |
| WO | WO 99/22127 | 5/1999 |
| WO | WO 99/63210 | 12/1999 |

OTHER PUBLICATIONS

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look Into Real Payoffs for Combined Cycle Conversions; Gas Turbine World; 1984; pp. 17, 18, 20, 22.

Pak, P. S. et al.; Closed Dual Fluid Gas Turbine Power Plant Without Emission of CO2 into the Atmosphere; IFAC/IFORS/IAEE Symposium; 1989; Pergamon Press; Tokyo Japan.

Bolland, O. et al.; New Concepts for Natural Gas Fired Power Plants which Simplify the Recovery of Carbon Dioxide; Energy Convers. Mgmt.; 1992; pp. 467–475; vol. 33, No. 5–8; Pergamon Press Ltd.; Great Britain.

Hendriks, C.A. et al.; Carbon Dioxide Recovery Using a Dual Gas Turbine IGCC Plant; Energy Convers. Mgmt.; 1992; pp. 387–396; vol. 33, No. 5–8; Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131–144; Cincinnati, Ohio.

Bolland, O. et al., Comparative Evaluation of Combined Cycles and Gas Turbine Systems with Water Injection, Steam Injection, and Recuperation; Transactions of the ASME; Jan. 1995; pp. 138–140, 142–145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice, I. G.; Steam–Injected Gas Turbine Analysis: Steam Rates; Journal of Engineering for Gas Turbines and Power; Apr. 1995; pp. 347–353; vol. 117.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across–the–Board Phase II NOx Limitations; Air Pollution Regulatory Analysis Service; Jan. 19, 1996; Article No. 96–2.

Agazzani, A. et al.; An Assessment of the Performance of Closed Cycles with and without Heat Rejection at Cryogenic Temperatures; International Gas Turbine and Aeroengine Congress & Exhibition; Jun. 10–13, 1996; Birmingham, UK.

Facchini, B. et al.; Semi–Closed Gas Turbine/Combined Cycle with Water Recovery and Extensive Exhaust Gas Recirculation; International Gas Turbine and Aeroengine Congress & Exhibition; Jun. 10–13, 1996; Birmingham, UK.

Nakhamkin, M. et al.; The Cascaded Humidified Advanced Turbine (CHAT); Journal of Engineering for Gas Turbines and Power; Jul. 1996; pp. 565–571; vol. 118.

Rice, I. G.; Split Stream Boilers for High–Temperature/High–Pressure Topping Steam Turbine Combined Cycles; Journal of Engineering for Gas Turbines and Power; Apr. 1997; pp. 385–394; vol. 119.

Ulizar, I. et al.; A Semiclosed–Cycle Gas Turbine With Carbon Dioxide–Argon as Working Fluid; Journal of Engineering for Gas Turbines and Power; Jul. 1997; pp. 612–616; vol. 19.

Wilson, D. G. et al.; The Design of High–Efficiency Turbomachinery and Gas Turbines, Second Editioin; 1998; pp. 146–161; Prentice Hall; Upper Saddle River, New Jersey.

Bannister, R. L. et al.; Development of a Hydrogen–Fueled Combustion Turbine Cycle for Power Generation; Transactions of the ASME; Apr. 1998; pp. 276–283; vol. 120.

Mathieu, P. et al.; Zero–Emission MATIANTt Cycle; Transactions of the ASME; Jan. 1999; pp. 116–120; vol. 121.

Norwegian Idea for CO2–Free Power Generation; Greenhouse Issues; Mar. 1999.

Turkenburg, W. C. et al.; Fossil Fuels in a Sustainable Energy Supply: The Significance of CO2 Removal; A Memorandum at the Request of the Ministry of Economic Affairs the Hague; Jun. 1999; pp. 1–26; Utrecht.

Bilger, R. W.; Zero Release Combustion Technologies and the Oxygen Economy; Fifth Int'l Conference on Technologies and Combustion for a Clean Environment; Jul. 1999; Lisbon, Portugal.

Bilger, R. W.; The Future for Energy from Combustion of Fossil Fuels; Fifth Int'l Conference on Technologies and Combustion for a Clean Environment; Jul. 1999; Lisbon, Portugal.

Herzog, H. et al.; Capturing Greenhouse Gases; Scientific American; Feb. 2000; pp. 72–79.

Anderson, R. E. et al.; A Unique Process for Production of Environmentally Clean Electric Power Using Fossil Fuels; 8th International Symposium on Transport Phenomena and Dynamics of Rotating Machinery; Mar. 2000; pp. 1–6; Honolulu, Hawaii.

Reinkenhof, J. et al.; Steam Generation with Modified H2/O2—Rocket Engines; unknown date.

Sternfeld, H.; A Hydrogen/Oxygen Steam Generator for the Peak–Load Management of Steam Power Plants; unknown date.

* cited by examiner

SEMI-CLOSED BRAYTON CYCLE GAS TURBINE POWER SYSTEMS

CROSS REFERENCE TO RELATED APPLICATIONS

This application claims benefit under Title 35, United States Code §119(e) of United States Provisional Application No. 60/203,726 filed on May 12, 2000 and United States Provisional Application No. 60/207,530 filed on May 26, 2000.

FIELD OF THE INVENTION

The following invention relates to Brayton cycle power generation systems which include a gaseous working fluid which is compressed, heated and expanded to generate power. More particularly, this invention relates to a semi-closed Brayton cycle power system which includes a gas turbine operating on a working fluid which is partially recirculated, the system eliminating emission of pollutants and emitting carbon dioxide in an easily separated and recoverable form.

BACKGROUND OF THE INVENTION

Gas turbine power systems have become popular systems for meeting modern society's power needs. Not only do gas turbines provide thrust for most large aircraft, but they also have been adapted for use in generation of electricity in stationary power plants.

Gas turbines operate on the Brayton cycle and have a working fluid, typically air, which remains gaseous throughout the cycle. While the Brayton cycle can theoretically be closed so that the working fluid recirculates, the vast majority of operational gas turbine power plants operate as an open Brayton cycle. In the open Brayton cycle commonly found in commercial stationary power plants, air is drawn into a compressor where its pressure and temperature increase. The temperature of the air is then further increased by combusting a fuel, most often natural gas, in the air to produce a working fluid including air (minus the oxygen which reacts with the fuel) and the products of combustion of the oxygen and the fuel (typically carbon dioxide and steam). This high temperature high pressure working fluid is fed into a turbine where the working fluid is expanded and its temperature and pressure decreased. The turbine drives the compressor and typically additionally drives a generator for the generation of electric power. The working fluid is exhausted from the turbine in a simple open Brayton cycle.

Most operational stationary gas turbine power systems include a simple open Brayton cycle only as one part of a combined cycle. Specifically, because the working fluid still has a relatively high temperature when exiting the turbine, this heat can be used, such as to generate steam in a heat recovery steam generator before finally being exhausted. The steam heated within the heat recovery steam generator can then be utilized to drive a steam turbine, such as that found in any typical closed Rankine cycle steam power plant. When operated as a combined cycle, the open Brayton cycle gas turbine and closed Rankine steam turbine combine to most efficiently extract power from the fuel combusted within the gas turbine (in some systems over 50% thermal efficiency).

While significant advances in compressor and turbine designs have greatly increased the efficiency with which the gas turbine operates and have increased the temperature at which the gas turbine can operate, the gas turbine has certain drawbacks. One drawback of the open Brayton cycle gas turbine is that the exhaust includes oxides of nitrogen ($NO_x$). $NO_x$ is a pollutant which can only be emitted in compliance with strict environmental regulations within the United States. Also, open Brayton cycle gas turbines emit carbon dioxide ($CO_2$) into the atmosphere. While emission of $CO_2$ is not currently regulated by the United States government, mounting scientific evidence has connected the emission of $CO_2$ with global warming and other negative atmospheric effects. Numerous proposals are being evaluated for regulation of the emission of $CO_2$. Accordingly, a need exists for a way to eliminate the emission of $NO_x$, $CO_2$ and other pollutants from gas turbines.

Techniques do exist for reduction of the emission of $NO_x$ and the elimination of $CO_2$ from open Brayton cycle gas turbine exhaust. The exhaust can be scrubbed of a significant portion of the $NO_x$ by various different processes applied to the exhaust to either convert (i.e. using ammonia) or separate the $NO_x$ from the exhaust. Such "scrubbers" not only decrease the efficiency of the operation of the gas turbine, they are costly and also fail to remove all of the $NO_x$ from the exhaust.

Large quantities of $CO_2$ are produced within the open Brayton cycle gas turbine as one of the major products of combustion of the natural gas in air. This $CO_2$ is exhausted in gas form mixed with the large amount of nitrogen in the air which passes through the gas turbine. If removal of the $CO_2$ is desired, the $CO_2$ must first be separated from the nitrogen and other gaseous constituents of the working fluid (i.e. by chemical and/or physical absorption of the $CO_2$, or endothermic stripping processes for separating $CO_2$ from the exhaust gases). The $CO_2$ can then be used in industrial processes or can be eliminated, such as by pressurization and sequestration in underground or deep sea locations. While such $CO_2$ sequestration is a known technique, significant energy is utilized in separating the $CO_2$ from the nitrogen, and hence the efficiency of the open Brayton cycle gas turbine is significantly decreased when $CO_2$ separation is required. Accordingly, a need exists for more efficient separation of the $CO_2$ from other portions of the working fluid so that the efficiency of the gas turbine is not radically diminished.

Closed Brayton cycle gas turbines have been developed for certain specific applications, such as for gas turbines which operate in nuclear power plants. In the closed Brayton cycle a working fluid is provided (typically Helium in nuclear power plants) which remains separate from the heat source and which is recirculated from the turbine exhaust back to the compressor without ever being exhausted. The compressor typically needs modification when the gas being compressed is changed. Because the working fluid is not exhausted, it is not a source of atmospheric pollution. The heat source which heats the working fluid can be nuclear, solar, geothermal or some other form of renewable non-polluting heat source so that atmospheric emissions are avoided.

However, if combustion of a hydrocarbon fuel with air is utilized to heat the working fluid between the compressor and the turbine, the closed Brayton cycle gas turbine will still have an exhaust which includes $CO_2$ and $NO_x$. While renewable non-polluting heat sources such as nuclear, solar and geothermal are effective, they suffer from drawbacks which have limited their ability to be fully competitive with hydrocarbon fuel combustion powered gas turbine systems. Other closed Brayton cycle or partially closed Brayton cycle gas turbine power systems have been proposed which utilize a mixture of $CO_2$ and oxygen as the combustion medium.

For instance, see U.S. Pat. No. 5,724,805 to Golomb. While such $CO_2$ closed Brayton cycle gas turbine systems do keep nitrogen out of the combustor and so do not produce $NO_x$, the high density of $CO_2$ makes it ill suited for use within a compressor which has been designed for compression of air. Accordingly, a need exists for a Brayton cycle gas turbine which heats the working fluid by combustion of a hydrocarbon fuel and which avoids emission of pollutants into the environment.

Another known technique for modifying prior art open Brayton cycle gas turbines is to inject steam into the combustor upstream of the turbine. When steam is injected into the combustor, the power output and the efficiency of the open Brayton cycle can be enhanced. Various different prior art steam injection open Brayton cycles are disclosed by Wilson and Korakianitis in *The Design of High-Efficiency Turbo Machinery and Gas Turbines,* Second Edition, 1998, Prentice-Hall, Inc. For instance, Wilson and Korakianitis cite one study by the General Electric Corporation that their LM5000 gas turbine, when fitted with steam injection and intercooling will experience a power increase from 34 MW to 110 MW and an efficiency improvement from 37% to 55%, compared to a simple Brayton cycle gas turbine power system with no associated Rankine cycle. Such steam injection open Brayton cycles typically do not operate as part of a combined cycle, but rather utilize the heat recovery steam generator to turn feed water into steam for injection upstream of the turbine. Hence, by steam injection, high efficiencies and high power outputs are provided without requiring a separate steam turbine and condenser as required for a combined cycle.

Steam injection open Brayton cycles also suffer from numerous drawbacks. Such cycles require feed water purification to keep the machinery in good working order. Water purification costs hence impede the desirability of prior art steam injection open Brayton cycles. Also, prior art steam injection open Brayton cycles still produce $NO_x$, carbon dioxide and other pollutants which are emitted into the atmosphere as with the non-steam injection open Brayton cycle gas turbine power systems described above.

The prevalence of open Brayton cycle gas turbines and particularly combined cycle gas turbine power systems throughout the world which are emitting large amounts of $NO_x$ and $CO_2$ into the environment makes desirable the provision of a method and apparatus for retrofitting open Brayton cycle gas turbines in a manner which does not interfere with the existing equipment but which eliminates emission of nitrogen oxides, $CO_2$ and other pollutants into the atmosphere, so that capital costs associated with such retrofits can be minimized. Such retrofits would additionally benefit from the use of a working fluid which matches the performance characteristics of working fluids in known prior art open Brayton cycle systems so that optimum performance of the system components can be maintained.

SUMMARY OF THE INVENTION

The needs for pollutant emission elimination and gas turbine efficiency preservation identified above are met by the semi-closed Brayton cycle gas turbine power system of this invention and the associated working fluids employed by this system. This power system utilizes all of the major components of an open Brayton cycle gas turbine power system and optionally also the major components of a combined cycle power system. Additional equipment is added to recirculate at least a portion of the working fluid exiting the turbine and to cool the exhaust if necessary so that it passes back to the compressor forming a semi-closed Brayton cycle.

Specifically, the semi-closed Brayton cycle power system of this invention includes a divider coupled to the turbine outlet of an otherwise known prior art open Brayton cycle gas turbine. The divider splits the exhaust flow of the working fluid exiting the turbine output. A portion of the divider leads to a return duct which directs a major portion (approximately 85%) of the turbine exhaust back to the compressor inlet. The other portion of the divider leads to a separation duct which leads to a condenser having a condensate outlet and a gas outlet.

An oxygen duct directs oxygen into the return duct so that oxygen is added to the portion of the turbine exhaust which passes from the divider into the return duct. The oxygen entering the return duct is mixed with the exhaust therein so that the compressor inlet receives a mixture of the turbine exhaust and the oxygen.

The compressor gas mixture typically includes three gases which are mixed together. These gases include oxygen, steam (water vapor) and $CO_2$. The percentage of the gas mixture which each one of these constituents provides can vary. A preferred simple constitution of the gas mixture can be 13% wt oxygen, 39% wt water and 48% wt $CO_2$. These constituent percentages can vary somewhat. Preferably, the constituents which form the compressor gas mixture are present at a ratio which is selected so that the gas mixture mimics the properties of air, which is itself a mixture of gases. At the preferred constituent percentages identified above, the various quantifiable physical properties of air (i.e. gas constant, specific heat, density, etc.) are closely matched. Hence, the compressor compresses the gas mixture in the same manner that it compresses air without operating outside of its design limits.

The compressed gas mixture enters the combustor where natural gas or pure methane is combusted with the oxygen in the gas mixture. The methane combusts with the oxygen in the gas mixture just as it would with the oxygen in air. If sufficient methane is supplied to consume all of the oxygen in the gas mixture (a stoichiometric mixture ratio), the working fluid exiting the outlet port of the combustor is entirely $CO_2$ and steam. These gases have two sources, $CO_2$ and steam from the gas mixture entering the combustor and $CO_2$ and steam generated as products of combustion of the oxygen and the methane.

This working fluid passes through the turbine and exits the turbine output as the exhaust. Because the exhaust is entirely $CO_2$ and steam, no $NO_x$ is present and no $NO_x$ elimination equipment need be utilized. If the semi-closed cycle is optionally acting as part of a combined cycle, the exhaust passes through a heat recovery steam generator where it gives up heat to the steam in the "bottoming" Rankine cycle. The exhaust then exits the heat recovery steam generator and enters the divider. A portion of the exhaust is directed to the return duct where it is directed back to the compressor. This exhaust, when mixed with the oxygen from the oxygen duct returns to the appropriate proportions necessary to constitute the gas mixture described in detail above. The gas mixture then again passes through the semi-closed Brayton cycle as described above.

A portion of the exhaust entering the divider is diverted into the separation duct. This exhaust enters a condenser. Because the exhaust is entirely $CO_2$ and water, and because water condenses at a much higher temperature than $CO_2$, the condenser can very effectively and efficiently condense the water while the $CO_2$ remains gaseous. A condensate outlet removes the water portion of the exhaust. The water is pure and can be utilized as desired without contamination of the environment.

The condenser gas outlet removes $CO_2$ from the condenser. This $CO_2$ is essentially pure. Hence, the high energy process of removing $CO_2$ from nitrogen which would be necessary to separate $CO_2$ from exhausts of prior art open Brayton cycle gas turbines is avoided. The $CO_2$ can be sold as an industrial gas, utilized beneficially or can be compressed and sequestered in an underground sequestration site, deep ocean location or any other suitable terrestrial formation.

Because the compressor gas mixture and other working fluids have properties which mimic those of air the major components of the open Brayton cycle gas turbine can be left unmodified and the remaining portions of the semi-closed Brayton cycle of this invention can be added so that an open Brayton cycle gas turbine power system can be retrofitted and modified into a non-polluting power plant. Such a retrofit can occur both for a simple open Brayton cycle gas turbine power system with addition of an appropriate turbine exhaust cooling heat exchanger and for a combined cycle power system.

The semi-closed Brayton cycle gas turbine power system of this invention can be adapted to utilize steam injection upstream of the turbine to provide the semi-closed Brayton cycle with the enhanced efficiency and power output benefits of steam injection detailed above. Because the semi-closed power system generates purified water, this generated water source is used and a separate purified water source is not required. Specifically, in the semi-closed cycle with steam injection a partial condenser is located within the return duct which condenses some of the steam out of the exhaust. The water produced by the condensation of some of the steam in the exhaust is routed through the heat recovery steam generator where it is converted back into steam.

This pure steam is then injected upstream of the turbine. For instance, the steam can be injected with the fuel, injected with the oxidizer from the compressor, or injected separately into the combustor or between the combustor and the turbine. While not preferred, excess water exiting the condenser downstream from the separation duct could similarly be utilized for steam injection.

When the steam is produced from water extracted from a partial condenser in the return duct, the ratio of steam to carbon dioxide within the working fluid passing through the return duct is decreased. As a result, the compressor can compress more oxygen and less steam with the same amount of work. With more oxygen passing through the compressor, more fuel can be combusted in the combustor and the power output of the semi-closed cycle is increased. Also, efficiency of the cycle is increased. While steam injection is typically utilized as a replacement for the "bottoming" Rankine cycle of the semi-closed combined cycle, steam injection could be utilized within a semi-closed combined cycle power system with the heat recovery steam generator generating steam for injection into the combustor upstream of the gas turbine and also generating steam for use within the bottoming Rankine cycle.

OBJECTS OF THE INVENTION

Accordingly, a primary object of the present invention is to provide a Brayton cycle gas turbine power system which does not emit $NO_x$ or other pollutants, and which efficiently collects $CO_2$ for beneficial use or elimination.

Another object of the present invention is to provide a Brayton cycle gas turbine power system which recirculates a portion of the turbine exhaust for input into the compressor of the power system.

Another object of the present invention is to provide a process for modifying an open Brayton cycle gas turbine to function as a semi-closed Brayton cycle gas turbine power system which substantially eliminates emission of pollutants.

Another object of the present invention is to provide substantially nitrogen free air substitute working fluids which can operate within a Brayton cycle gas turbine without significantly altering the performance of the gas turbine and eliminate pollutant emissions from the gas turbine.

Another object of the present invention is to provide a power system which can efficiently generate power from the combustion of hydrocarbon fuels without emission of pollutants.

Another object of the present invention is to provide a semi-closed gas turbine power system with steam injection to enhance the power output and, efficiency of the power system.

In addition to the above objects, various other objects of this invention will be apparent from a careful reading of this specification including the detailed description contained herein below.

BRIEF DESCRIPTION OF THE DRAWING FIGURES

DETAILED DESCRIPTION OF THE PREFERRED EMBODIMENT

Figure 2:
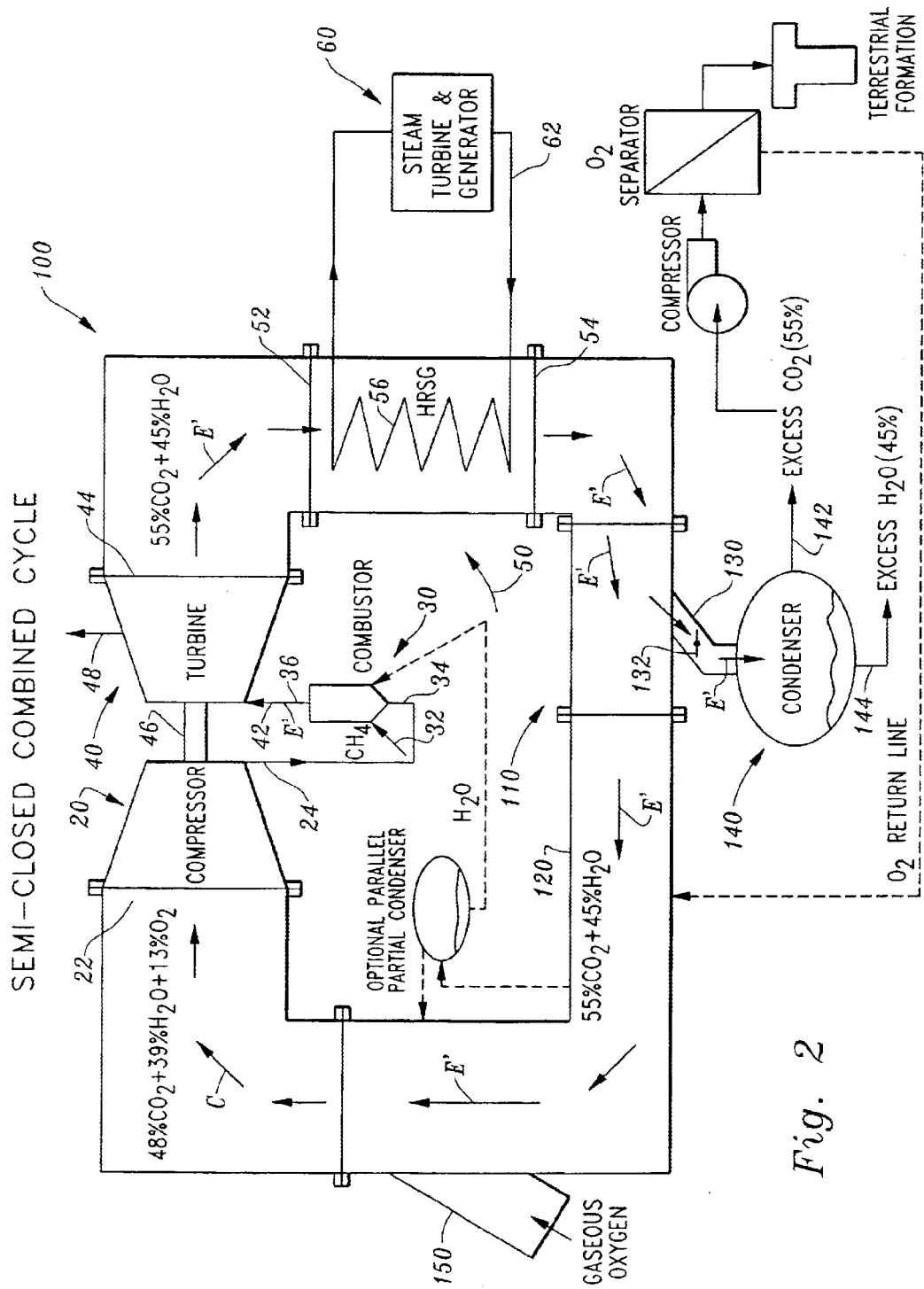
FIG. 2 is a schematic of a semi-closed combined cycle gas turbine power system according to this invention.

Referring to the drawings, wherein like reference numerals represent like parts throughout the various drawing figures, reference numeral 10 is directed to a prior art gas turbine combined cycle power system which can be retrofitted according to this invention to become a semi-closed gas turbine combined cycle power system 100 (FIG. 2).

While many variations and enhancements to this invention are possible, this invention is illustrated by the following detailed disclosure of a simple conversion of a combined cycle gas turbine power system into the semi-closed combined cycle power system of this invention. This disclosure is believed to be the best mode for such a simple conversion. It is acknowledged that enhancements could be made to increase the complexity and performance characteristics of the invention. Such enhancements are not considered to be part of the best mode for practicing the simple conversion of this invention.

This disclosure is also provided to enable one skilled in the art to perform the basic conversion of a combined cycle gas turbine power system 10 into the semi-closed combined cycle power system 100 of this invention or to construct the semi-closed combined cycle power system 100 of this invention originally from the separate components making up this system 100. Also, this disclosure is provided to disclose the best mode for performing this simple conversion of the combined cycle gas turbine power system 10 into the semi-closed combined cycle power system 100 of this invention in its simplest and most easily executable form.

Figure 1:
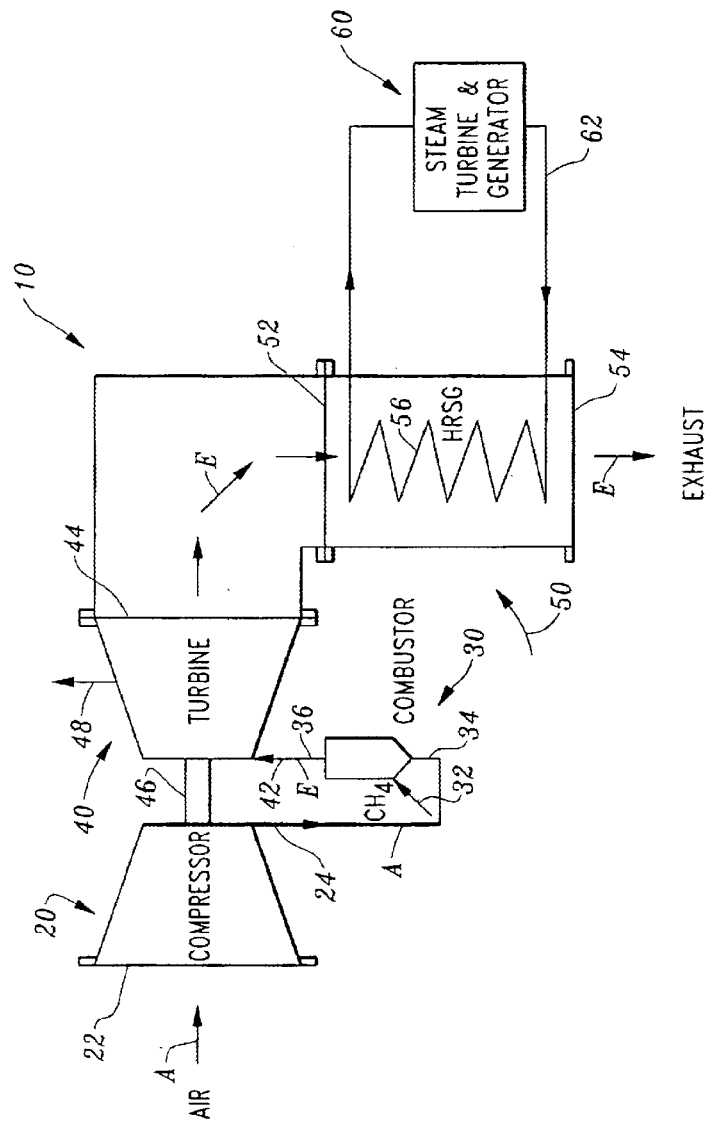
FIG. 1 is a schematic of a combined cycle gas turbine power system such as that which is in common use for electric power generation.

In essence, and with particular reference to FIG. 2, the semi-closed combined cycle power system 100 preferably includes all of the equipment contained within a prior art open Brayton cycle gas turbine, such as in the power system 10 shown in FIG. 1. The semi-closed power system 100 adds a divider 110 to an exhaust of a turbine 40. The divider 110 diverts some of the exhaust to a return duct 120 which leads to a compressor 20. Other portions of the exhaust are diverted to a separation duct 130 which leads to a condenser 140. An oxygen duct 150 introduces oxygen into the return duct 120 so that the compressor receives a mixture of turbine exhaust and oxygen.

The compressor compresses this gas mixture and utilizes it within a combustor 30 to combust fuel, such as natural gas or pure methane. The combustor exhaust is then passed through the turbine where it is expanded and does work, both driving the compressor and outputting power from the power system 100. The exhaust is then directed back to the divider 110 identified above.

While not necessary, maximum efficiency can be provided by passing the exhaust through a heat recovery steam generator 50 between the turbine 40 and the divider 110. The heat recovery steam generator 50 transfers heat out of the exhaust E and into a steam heating circuit which leads to a separate steam turbine and generator 60 for additional power output from the power system 100.

This semi-closed power system 100 completely operates on mixtures of gases including $CO_2$, steam and oxygen. Portions of these gases which are diverted by the divider 110 to the separation duct 130 can be exhausted into the atmosphere as none of these gases are currently regulated in the United States with restrictions on their emission as pollutants. However the exhaust, which is primarily $CO_2$ and water, can easily be separated within a condenser so that pure streams of excess water and excess $CO_2$ can be provided. These pure streams can then be further handled in a manner other than exhaust into the environment if desired such as to avoid emission of $CO_2$, a greenhouse gas.

More particularly, and with specific reference to FIG. 1, details of the prior art combined cycle gas turbine power system 10 are described which can be retrofitted to form the semi-closed power system 100 of this invention. The combined cycle gas turbine power system 10 is a variation on the open Brayton cycle. Combined cycle gas turbines are in widespread use in the United States and are capable of particularly high power output per unit size and particularly high efficiency. A simplest open Brayton cycle gas turbine power system could also be modified according to this invention by merely eliminating the heat recovery steam generator 50 and steam turbine and generator assembly 60 from the power systems 10, 100.

The combined cycle gas turbine power system 10 begins by induction of air A into an inlet 22 of a compressor 20. The compressor 20 increases a pressure of the air A, typically approximately tenfold before the air A leaves the compressor 20 through the outlet 24. The air A is then directed to an oxidizer port 34 of a combustor 30. The combustor 30 additionally includes a fuel port 32. The fuel port 32 delivers fuel, typically natural gas or pure methane, into the appropriate combustor 30. With modifications, other hydrocarbon fuels can be used.

The oxidizer port 34 has air A passing therethrough and into the combustor 30 when the combined cycle gas turbine power system 10 is operating according to the prior art.

While air can be considered to be an oxidizer, it is in fact the oxygen within the air which acts as the oxidizer. Other constituents of the air, primarily nitrogen, largely do not react within the combustor 30 and merely pass through the turbine 40 as part of the exhaust E. However, the combustor 30 typically achieves sufficiently high temperatures during combustion of the fuel that some of the nitrogen does react with the oxygen in the air to form nitrogen oxides, referred to as $NO_x$. Hence, the exhaust E leaving the combustor 30 through the outlet port 36 not only includes products of combustion of the fuel with the oxygen, namely $CO_2$ and steam, but additionally includes the nitrogen in the air as well as $NO_x$ and typically some quantity of volatile organic compounds, referred to as VOCs, and particulates.

These various constituents of the gas mixture exiting the combustor 30 through the outlet port 36 are together referred to as the exhaust E. The exhaust E is then directed to the turbine 40 through the input 42. The exhaust E passes through the turbine 40 and exits the turbine 40 through the output 44. The turbine 40 includes a compressor drive shaft 46 or other mechanical, electrical or other power coupling between the turbine and the compressor 30 which allows a portion of the power generated by the turbine 40, as the exhaust E expands through the turbine 40, to drive the compressor 20. Additional power 40 generated by expansion of the exhaust E through the turbine 40 is outputted from the turbine 40, typically to an electricity generator along arrow 48. However, it is known in the prior art for the turbine 40 to be directly coupled to a prime mover or transmission, such as a prime mover on a ship or to an output nozzle on a jet engine, or to otherwise be mechanically or otherwise coupled to other devices for outputting of power other than to an electricity generator.

The exhaust E can be released into the surrounding atmosphere upon exiting the output 44 of the turbine 40. In such an arrangement, the gas turbine is functioning as a simple open Brayton cycle gas turbine power system, rather than as a combined cycle gas turbine power system 10. Preferably, however, in situations where efficiency is to be maximized or where steam production is beneficial for heating or use in processing equipment which requires steam, the exhaust E is directed to a heat recovery steam generator 50.

The heat recovery steam generator 50 includes an entrance 52 which receives the exhaust E and an exit 54 where the exhaust E is released into the surrounding environment. The heat recovery steam generator includes a steam heating circuit 56 therein which receives heat which is transferred out of the exhaust E into the steam heating circuit 56. The steam heating circuit 56 is part of a steam turbine and generator assembly 60 which has a working fluid pathway 62 which passes into the steam heating circuit 56 of the heat recovery steam generator 50 before returning the steam working fluid back to the steam turbine and generator assembly 60. This assembly 60 would typically include a condenser and pump, as is known in the art to provide a closed Rankine cycle. An alternative to the assembly 60 is to merely provide the steam in the pathway 62 for other heating requirements (i.e. food processing, chemical processing, heating buildings, etc.)

The steam turbine and generator assembly 60 function as a typical closed Rankine cycle steam power plant except that rather than having a fired boiler for boiling the water to make steam working fluid, the water is passed through the steam heating circuit 56 of the heat recovery steam generator 50 within the combined cycle gas turbine power system 10 to boil the water into steam working fluid before it is directed into the steam turbine of the steam turbine and generator assembly 60 or used for other heating purposes. In essence, the heat recovery steam generator 50 and the steam turbine and generator assembly 60 put to use the excess heat remaining within the exhaust E so that an overall efficiency of the combined cycle gas turbine power system 100 is increased.

The exhaust E which is directed into the atmosphere has the same constituents that it has upon exiting the combustor 30 through the outlet port 36. Namely, the exhaust E is a majority nitrogen from the air A which was introduced through the compressor 20 and into the oxidizer port 34 of the combustor 30. The exhaust E also includes large amounts of $CO_2$ and steam which were generated within the combustor 30 by the combustion of the methane, natural gas or other hydrocarbon fuel with the oxygen in the air A. The exhaust E would typically additionally include oxygen which was in excess of the amount necessary to combust all of the fuel.

The nitrogen, any excess oxygen and the steam are exhaust E constituents which are already prevalent in Earth's atmosphere and do not impact the quality of the environment. The $CO_2$ within the exhaust E is also a constituent of air in Earth's atmosphere, but is present as less than 1% of air. While $CO_2$ is a constituent of air, within Earth's atmosphere, evidence is mounting that detrimental environmental impacts are associated with increases in the $CO_2$ present within Earth's atmosphere. For instance, $CO_2$ is often referred to as a "greenhouse gas" which is believed to contribute to global wanning.

$CO_2$ is not currently regulated in the United States as a pollutant, but elimination of $CO_2$ from the exhaust E which is directed back into earth's environment from combined cycle gas turbine power systems 10 is widely considered to be a desirable objective. The remaining constituents of the exhaust are pollutants which in many cases have emission thereof strictly regulated and which detrimentally impact air quality if released or which severely diminish efficiency if collected.

With particular reference to FIG. 2, the semi-closed combined cycle power system 100 of this invention is described in detail. The semi-closed power system 100 begins with each of the major components of the combined cycle gas turbine power system 10 (FIG. 1) described in detail above. However, the exit 54 of the heat recovery steam generator 50 does not direct the exhaust E' directly into the surrounding atmosphere. Rather, a divider 110 is provided which receives the exhaust E' exiting from the exit 54 of the heat recovery steam generator 50. The divider 110 has two outlets including a return duct 120 and a separation duct 130. The return duct 120 directs a major portion (approximately 85%) of the exhaust E' back to the inlet 22 of the compressor 20. The separation duct 130 directs a remaining portion of the exhaust E passing through the divider 110 to a condenser 140.

The divider 110 can have any of a variety of configurations. The primary feature of the divider 110 is that it is capable of splitting the exhaust E' flow into the two separate pathways including the return duct 120 and the separation duct 130. In a simplest form of the invention, the divider could be unadjustable and merely utilize pressure differentials between the return duct 120 and the separation duct 130 to divide the exhaust E' flow between the return duct 120 and the separation duct 130.

Alternatively, a pressure sensitive valve 132 of some sort could be used, such as by placement in the divider separation duct 130. For instance, if it is desirable for the return duct 120 to have a pressure slightly higher than atmospheric, the valve would be slightly closed to increase the resistance of separation duct 130 and reduce the flow rate. This temporary reduction in the flow rate of separation duct 130 increases the flow rate of return duct 120 and thus increases the recirculating mass of the system and corresponding pressure level. When the proper pressure is achieved, the valve in separation duct 130 is returned to its original position. To reduce the system pressure the reverse of these steps is performed.

Because the combustor 30 increases an amount of gas in the system, more exhaust E' flows out of the turbine 40 than the amount of gas that flows into the compressor 20. To keep the pressure within the return duct 120 at the desired level, such as near or slightly above atmospheric pressure, the separation duct 130 would have the valve 132 within the separation duct 130 open sufficiently so that excess exhaust E' would be diverted through the separation duct 130 and the desired pressure within the return duct 120 would be maintained. Such a valve 132 in the separation duct 130 would control the pressure of the system by increasing or decreasing the flow rate exiting duct 130 until the desired pressure has been reached and steady state conditions are achieved.

The control valve 132 could also be configured with a vane/damper which might automatically move to divert more or less flow from the return duct 120 and into separation duct 130 merely by pressure monitoring. Also, the vane/damper 130 could be coupled to a drive axle and pressure sensors or other sensors for controlling the semi-closed power system 100 could be utilized to actively control flow rates and pressures within the return duct 120 and the separation duct 130 by controlling the position of the vane/damper 130 within the separation duct 130.

The return duct 120 typically is in the form of a substantially airtight conduit. Because the return duct 120 includes exhaust E' therein which includes steam, it would typically need to maintain sufficient temperatures, approximately 180° F. to 200° F. so that the steam making up a portion of the exhaust E' does not condense within the return duct 120. The return duct 120 can be fitted with insulation to prevent condensation along the walls of the return duct 120. Additionally, or alternatively, the return duct 120 can be manufactured from materials which can accommodate the condensation of small amounts of water out of the exhaust 120 and merely provide water traps at lowermost portions of the return duct 120 to collect any water condensing within the return duct 120 and direct the water out of the return duct 120, such as into the condenser 140.

The return duct 120 additionally includes an oxygen duct 150 which introduces oxygen into the return duct 120. The oxygen duct 150 is coupled to a source of gaseous oxygen. Such a gaseous oxygen source could be of a variety of types including air separation units which are capable of removing oxygen from the air, a gaseous oxygen pipeline, a liquid oxygen tank under pressure which bleeds off gaseous oxygen into the oxygen duct 150 or any of a variety of other oxygen supply sources. Preferably, the oxygen duct 150 receives oxygen from an air separation unit which is powered by power outputted from the turbine 40, so that the entire semi-closed combine cycle power system 100 includes the air separation unit therein. The air separation unit can be of a liquefaction type which separates the oxygen from the air by cooling the air to below the condensation point for the nitrogen in the air so that the nitrogen is removed from the oxygen in the air. Such a cryogenic air separation system is described in detail in U.S. Pat. No.

5,611,219 to Bonaquist, incorporated herein by reference. Alternatively, the air separation unit can be configured utilizing ion transfer membrane technology such as that described in detail in U.S. Pat. No. 5,447,555 to Ye, incorporated herein by reference. Other techniques such as vacuum pressure swing adsorption could similarly be utilized, such as that described in detail in U.S. Pat. No. 5,194,890 to McCombs incorporated herein by reference, to separate oxygen out of the air and deliver the oxygen from the oxygen duct 150 into the return duct 120.

The oxygen from the oxygen duct 150 is introduced into the exhaust E' within the return duct 120 to form a gas mixture C, called "C-gas" which mimics the characteristics of air. Specifically, the gas mixture C includes the products of combustion of the methane or natural gas with oxygen, namely $CO_2$ and steam along with the oxygen introduced from the oxygen duct 150.

The ratio of the $CO_2$ with the steam is similar to that which naturally occurs when the methane or natural gas fuel is combusted stoichiometrically with oxygen. Specifically, this ratio of $CO_2$ to steam when methane is combusted in oxygen stoichiometrically is 55% $CO_2$ by weight and 45% steam by weight. This ratio of $CO_2$ to steam is maintained within the exhaust E', through the divider 110, along either the return duct 120 or the separation duct 130 and into the compressor 20, where the exhaust E' is combined with the oxygen from the oxygen duct 150 to form the gas mixture C. However, when the oxygen is mixed with the exhaust E' including the $CO_2$ and the steam, the gas mixture C additionally includes the oxygen. While the ratio of $CO_2$ to water remains the same, the ratio of $CO_2$ to the overall gas mixture C and the ratio of the steam to the overall mixture of the gas mixture C are reduced by an amount proportional to the amount of oxygen introduced into the return duct 120 through the oxygen duct 150. An example of this gas mixture C is provided as follows.

EXAMPLE 1.

In this example a minimum amount of oxygen is supplied by the oxygen duct 150 so that the methane fuel burns at a stoichiometric ratio with the oxygen within the gas mixture C and no excess oxygen remains in the exhaust E'. In this hypothetical example, the gas mixture C would be provided with sufficient oxygen so that the gas mixture C would be 13% oxygen by weight.

Note that air is approximately 23% oxygen by weight and typically reacts with methane with some excess air present which is not necessary for combustion of all of the methane. The gas mixture C has the $CO_2$ constituents and steam constituents proportionally reduced to provide for the inclusion of the oxygen as 13% wt of the gas mixture C. Specifically, the $CO_2$ is reduced from 55% wt of the exhaust E' to 48% wt of the gas mixture C. The steam is reduced from 45% wt of the exhaust E' to 39% wt of the gas mixture C.

Various different formulations for the gas mixture C can be provided, varying from the specific gas mixture C of Example 1, while remaining within the basic concept of the semi-closed combined cycle power system 100 of this invention. Other examples could certainly be utilized.

A serendipitous and remarkable attribute of the semi-closed combined cycle power system 100 of this invention is that when oxygen is added to the natural products of combustion of methane and oxygen, in an amount sufficient to replace the combusted oxygen, the resulting gas mixture C (having 48% $CO_2$, 39% water and 13% oxygen by weight) has attributes which very closely mimic the attributes of air in earth's atmosphere. Hence, not only is the gas mixture C the most simply achievable constituent makeup for the gas mixture C, but this, gas mixture C also has air mimicking characteristics which allow it to be directed into the compressor 20 and operate within the design parameters of the compressor 20 that has been originally designed and constructed for the compression of air A (FIG. 1) rather than the gas mixture C. As a result, the compressor 20 does not require modification to handle the gas mixture C rather than air A (FIG. 1).

Table 1 provides twelve quantifiable gas parameters which are important to the design of compressors such as the compressor 20. In this table the values for the parameters of the gas mixture C, proposed in the above example, are shown alongside the values for these various parameters for air. A review of this table and a comparison between the gas mixture C and air shows that for most parameters the values for air and the values for the various gas mixture C are very close. The inlet pressure of the semi-closed cycle 100 can be adjusted, as described above, to better match gas mixture C properties with those for air. Also, small compressor speed changes may be desirable. Such speed changes can be done when the compressor design characteristics are known, to fully optimize the cycle 100.

TABLE 1

| Parameter | Gas Mixture[1] | Air |
| --- | --- | --- |
| Gas Constant - R, ft/° F. | 56.6 | 53.3 |
| Specific Heat - Btu/lb ° F. | 0.336 | 0.250 |
| Specific Heat Ratio ($\gamma$) | 1.28 | 1.38 |
| Typical Pressure Ratio | 30 | 30 |
| Inlet Temperature ($T_1$), ° F. | 200 | 80 |
| Outlet Temperature ($T_2$), ° F.[2] | 1058 | 1065 |
| Inlet Pressure ($P_1$), psia | 17.4 | 14.7 |
| Outlet Pressure, psia | 522 | 441 |
| Inlet Density, lb/ft³ | 0.0671 | 0.0735 |
| Outlet Density, lb/ft³ | 0.875 | 0.781 |
| Weight Flow Ratio - (Inlet Cond)[3] | 1.00 | 1.00 |
| Speed Ratio (N/$N_{AIR}$)[4] | 0.99 | 1.00 |

[1]Values for the gas mixture C including 13% oxygen, 39% steam and 48% CO2, by weight calculated by adding known values for each gas constituent multiplied by its percentage of the gas mixture.
[2]Compressor efficiency~85%
[3]$P_1 * SQRT(\gamma RT_1)$ = CONSTANT (where R is the gas constant)
[4]$N/SQRT(\gamma RT_1)$ = CONSTANT After the exhaust E' exits the output 44 of the turbine 40, the exhaust E' is 55% $CO_2$ and 45% steam by weight. Some of the $CO_2$ and the steam are produced within the combustor 30 and some enter the combustor 30 through the oxidizer port 34 as part of the gas mixture C.

Preferably, the exhaust E' is routed through the heat recovery steam generator 50 so that heat can be removed from the exhaust E' to drive a steam turbine and generator assembly 60 so that additional power can be generated from the semi-closed combined cycle power system 100. However, utilization of the heat recovery steam generator 50 is not strictly required for this power system 100. Rather, the turbine output 44 could lead directly to the divider 110 so that a semi-closed simple Brayton cycle variation on the power system 100 would be provided.

When the exhaust E' exits the heat recovery steam generator 50 it has a lower enthalpy but maintains its 55% wt $CO_2$ and 45% wt steam constituent ratio. This exhaust E' encounters the divider 110 where a first portion thereof is directed to the return duct 120 for redirection back to the compressor 20. A second portion of the exhaust E' is diverted by the diverter 110 to the separation duct 130. During steady state operation, the amount of exhaust E' directed to the separation duct 130 is precisely identical to the amount of $CO_2$ and steam which are generated by the combustion of methane with oxygen within the combustor. In essence, some of the $CO_2$ and water remain in the semi-closed power system 100 by passing along the return duct 120 and other portions of the exhaust E' are removed from the power system 100 so that the amount of working fluid passing through the components making up the power system 100 remains constant.

Another serendipitous result of the semi-closed power system 100 of this invention is that the exhaust E' has a desired constituent makeup which allows it to mimic air merely by having an appropriate amount of oxygen from the oxygen duct 150 added to a portion of the exhaust E' within the return duct 120. Hence, the divider 110 need not discriminate between different constituent gases within the exhaust E' when dividing a portion of the exhaust E' for passage along the separation duct 130 and out of the system 100. Rather, it is merely necessary that a homogeneous portion of the exhaust E' which matches an amount of the exhaust E' which was generated within the combustor as products of combustion of the methane and oxygen (approximately 15%) be diverted into the separation duct 130. This portion of the exhaust E' passing through the separation duct is thus approximately 55% $CO_2$ and 45% water by weight.

The separation duct 130 directs this portion of the exhaust E' into the condenser 140. Because steam/water is ordinarily a liquid at standard atmospheric conditions and $CO_2$ is typically a gas at standard atmospheric conditions, the condenser 140 can effectively and completely separate the steam/water constituent of the exhaust E' from the $CO_2$ constituent of the exhaust E'. Specifically, cooling water, cooling air or some other cooling medium is typically provided within the condenser 140 to cool the exhaust E' to below the condensation point for the steam/water. The steam/water then condenses into a liquid and can be easily removed from a bottom of the condenser 140 along an excess water condensate outlet 144. Cooler portions of the condenser 140 which still contain gas lead to a gas outlet 142 which will be primarily $CO_2$, with some water vapor remaining therein. Any water vapor in the $CO_2$ is removed during its processing.

The excess water can be utilized in a variety of ways or discharged into a surrounding environment. The excess $CO_2$ exiting the condenser 140 along the gas outlet 144 is a substantially pure stream of $CO_2$. While $CO_2$ can be exhausted into the atmosphere in an unregulated fashion under current regulations, its separation into a substantially pure stream at the gas outlet 142 allows for other uses for the $CO_2$ rather than exhausting into the atmosphere.

Specifically, the $CO_2$ could be sold in the industrial gas market, it could be utilized in processes which benefit from use of $CO_2$, or it can be pressurized into a liquid form for storage or disposal. Because relatively large quantities of $CO_2$ are produced by the combustion of the methane with oxygen, regardless of the beneficial uses provided for the $CO_2$, some $CO_2$ will remain which must be disposed of.

One known prior art technique is to pressurize the $CO_2$ sufficiently so that it can be sequestered into underground depleted oil wells or other underground fissures, or directed into deep ocean locations, or any other appropriate terrestrial formation. Such pressurization only places a minimal efficiency penalty on the semi-closed combined cycle power system 100 because substantially only the $CO_2$ need be pressurized. In contrast, the prior art combined cycle gas turbine 100 with an exhaust including nitrogen and $CO_2$ would incur a significant efficiency penalty in separating the nitrogen and other gases from the $CO_2$ before pressurization of the remaining separated $CO_2$ for sequestration. In essence, removal of oxygen from the air in an air separation unit coupled to the oxygen duct 150 before combustion of the fuel with the gas mixture C, is more efficient than combusting the fuel in air and later separating the exhaust so that the $CO_2$ can be appropriately handled. Also, 100% of the $CO_2$ is removable, rather than the 85% to 90% removable with known prior art systems.

Typically, some water vapor may remain within the gas outlet 142. During the process of pressurizing the $CO_2$ within the gas outlet 142, an initial stage of pressurization would typically cause remaining portions of steam passing through the gas outlet 142 to be removed from the gas outlet 142. Additionally, other gases which might remain within the gas outlet 142 can be similarly removed. For instance, any excess oxygen which was not combusted within the combustor 30 can conceivably be captured from the gas outlet 142 during the compression of the $CO_2$ in that the oxygen would remain gaseous after the $CO_2$ has been liquefied. The oxygen could then be routed to the oxygen duct 150. Argon and other trace gases could also be separated from the $CO_2$, for recovery and sale as by-products.

Figure 4:
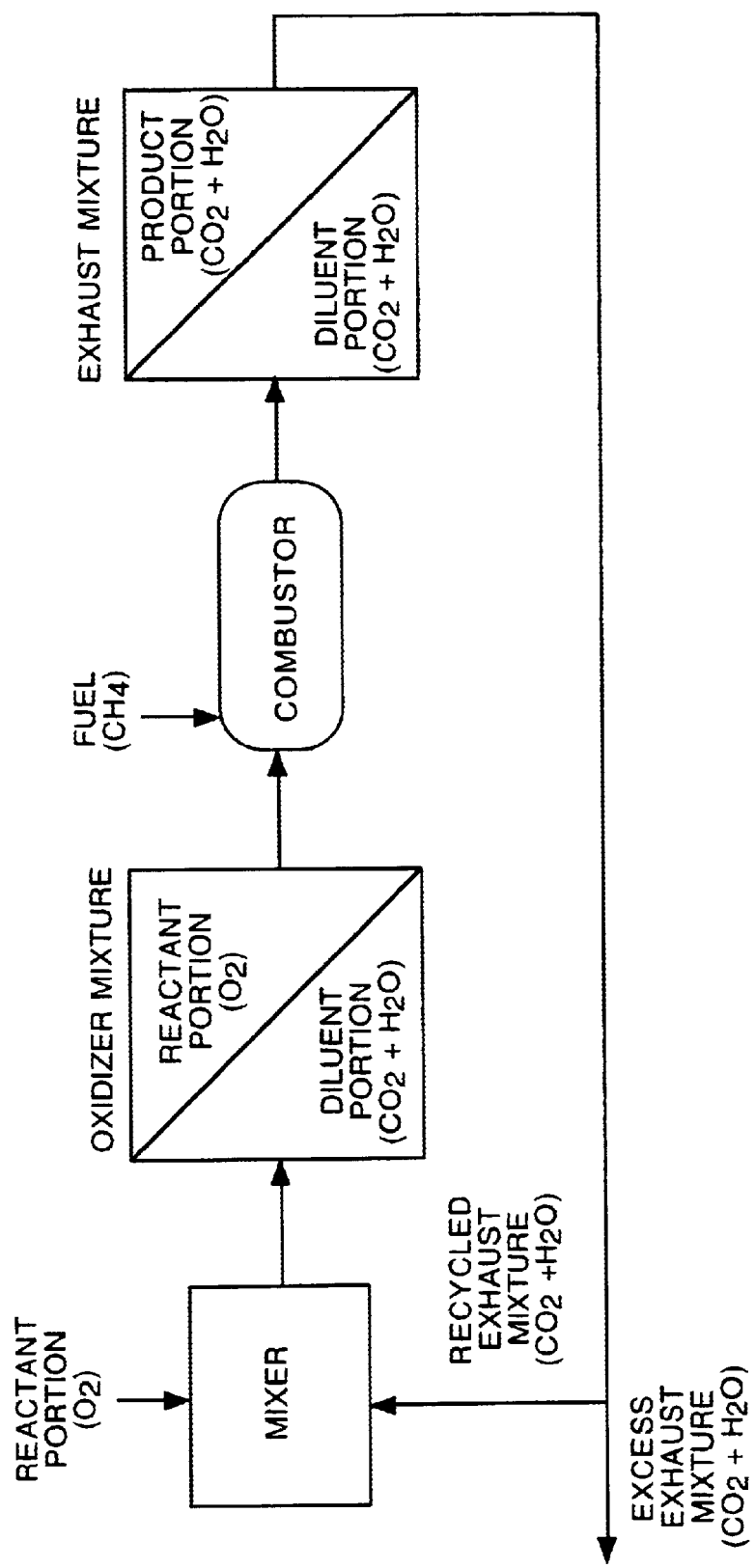
FIG. 4 is a schematic showing how the compressor gas mixture and combustion products are created and routed through the semi-closed Brayton power system.

With particular reference to FIG. 4, details of the routing and transformation of the working fluid within the semi-closed Brayton cycle of this invention are described. The working fluid of the semi-closed Brayton cycle includes two distinct mixtures at different portions of the cycle. A first oxidizer mixture of the working fluid includes oxygen or some other oxidizer and defines the working fluid of the cycle upstream of the combustor. A second exhaust mixture of the working fluid is located downstream of the combustor and reflects inclusion of the combustion products created within the combustor.

While the oxidizer mixture and exhaust mixture forms of the working fluid could have a variety of different constituent chemical species, a preferred embodiment of this invention configures the oxidizer mixture and the exhaust mixture of the working fluid for combustion of methane or natural gas (natural gas is largely methane) with oxygen at a near stoichiometric ratio. In such a configuration, the oxidizer mixture constituent chemical species includes gaseous molecular oxygen ($O_2$) as the only reactant constituent chemical species and a mixture of carbon dioxide and water vapor as the diluent constituent element species and as the product constituent chemical species. When methane is combusted with oxygen the chemical equation for this reaction is as shown in equation 1.

$$CH_4 + 2O_2 \rightarrow CO_2 + 2H_2O \qquad \text{(equation 1)}$$

This combustion reaction is a high energy exothermic reaction, resulting in release of substantial amounts of energy which in turn allow for a large amount of power generation by the semi-closed Brayton cycle power generation system of this invention. In fact, when methane and oxygen are combusted at this stoichiometric ratio (equation 1) the carbon dioxide and steam combustion products typically obtain a temperature of approximately 6,000° F. (depending on the temperature of the reactants and other combustion conditions).

The challenges associated with handling such high temperature gases without damaging the combustor or the turbine downstream of the combustor are not easily managed. To reduce this combustion products temperature and confine the highest temperature combustion products to as small an area as possible, a non-reacting diluent is included as part of the oxidizer mixture.

In prior art Brayton cycle power generation systems, such an oxidizer mixture has merely been ambient air. Air has the requisite amount of oxygen to form a reactant portion of the air oxidizer mixture. When the oxidizer mixture is air, the diluent portion is primarily gaseous nitrogen ($N_2$) with the nitrogen diluent constituting about eighty percent of the oxidizer mixture. The diluent portion of the oxidizer mixture is not altered in the combustion reaction. Rather, it merely passes through the combustor and helps regulate a temperature of the combustion products.

In essence, and as shown in FIG. 4, the reactant portion (oxygen) of the oxidizer mixture reacts with the fuel (methane) to produce the combustion product portion (carbon dioxide and water) of the exhaust mixture form of the working fluid. The diluent portion (nitrogen) merely passes through the combustor and is heated, forming the diluent portion (nitrogen) of the exhaust mixture form of the working fluid. Unfortunately, some of the nitrogen diluent portion does react with the oxygen at the high temperatures experienced within the combustor, such that nitrogen oxides ($NO_x$) are produced. Also, the nitrogen diluent portion of the exhaust mixture is difficult to separate from the carbon dioxide constituent of the product portion (carbon dioxide and water) of the exhaust mixture. Hence, the nitrogen diluent interferes with collection of the carbon dioxide in the exhaust mixture downstream of the combustor.

This invention uniquely replaces the nitrogen diluent portion in the oxidizer mixture with a diluent portion comprised primarily of carbon dioxide and water. Hence, the oxidizer mixture is formed of the reactant portion (oxygen) and the diluent portion (carbon dioxide and water). As with the prior art Brayton cycle, the reactant portion (oxygen) combusts with the fuel (methane) to form the product portion (carbon dioxide and water) of the exhaust mixture. The diluent portion (carbon dioxide and water) passes through the combustor substantially unaltered and forms the diluent portion (carbon dioxide and water) of the exhaust mixture.

Additionally, the ratio of carbon dioxide to water in the diluent portion of the oxidizer mixture is selected to match the ratio of carbon dioxide to water in the product portion of the exhaust mixture. Hence, the exhaust mixture includes both a product portion (carbon dioxide and water) and a diluent portion (carbon dioxide and water) which have the same carbon dioxide to water ratios. The exhaust mixture is thus a single homogeneous mixture of carbon dioxide and water having a carbon dioxide to water ratio matching that which naturally occurs when oxygen and methane are combusted together at a stoichiometric ratio.

Figure 3:
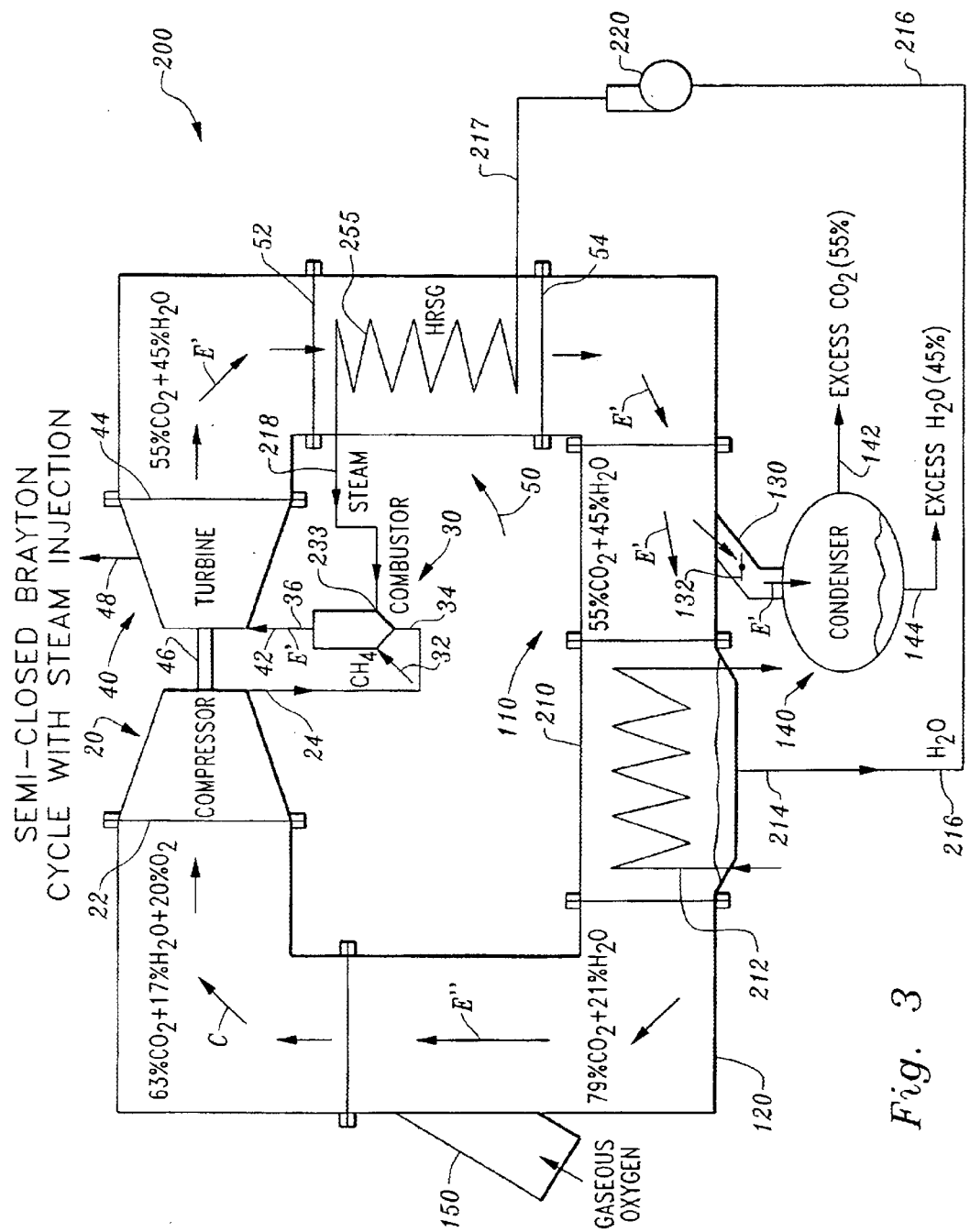
FIG. 3 is a schematic of a semi-closed gas turbine power system with steam injection according to this invention.

The exhaust mixture form of the working fluid is recirculated according to the semi-closed Brayton cycle. Before this recirculation is complete, a portion of the exhaust mixture is diverted out of the cycle so that a total amount of carbon dioxide and water within the system remains constant even though carbon dioxide and water are continually being produced within the system. The recycled exhaust portion (carbon dioxide and water) passes through a mixer where the reactant portion (oxygen) is added back to the recycled exhaust portion (carbon dioxide and water) to again form the oxidizer mixture form of the working fluid, including the reactant portion (oxygen) and the diluent portion (carbon dioxide and water). This mixer of FIG. 4 is generally depicted in FIGS. 2 and 3 where the oxygen supply duct 150 joins the return duct 120 but could be a specific mixing structure located anywhere between the turbine/expander output and the compressor.

As specified in detail above, the specific constituent percentages of the chemical species forming the reactant portion and diluent portion of the oxidizer mixture and the product portion and diluent portion of the exhaust mixture can vary to satisfy the particular design criteria for any particular system. The two specific examples identified above and the three gas composition formulations identified in example 2 are merely a few representative samples. One sample overall formulation is shown below as equation 2.

$$6(CO_2+2H_2O)+2O_2+CH_4 7(CO_2+H_2O) \qquad \text{(equation 2)}$$

In equation 2 the diluent portion ($CO_2+2H_2O$) is shown with a prevalence three times that of the reactant portion ($O_2$). Stated alternatively, seventy-five percent of the oxidizer mixture is diluent and twenty-five percent of the oxidizer mixture is oxygen. A greater or lesser ratio of diluent portion to reactant portion could be provided if desired. If a lesser diluent portion is provided, temperatures of combustion will typically be elevated. Conversely, if a greater amount of diluent is included, lesser temperatures would typically be experienced. Certainly if other hydrocarbon fuels were utilized and combusted with oxygen equations 1 and 2 could be appropriately modified to provide an appropriate balance of constituent chemical species forming the oxidizer mixture and the exhaust mixture forms of the working fluid for the semi-closed Brayton cycle power generation system of this invention.

The oxidizer mixture can be further modified according to the steam injection variation of the semi-closed Brayton cycle shown in detail in FIG. 3. In such a steam injection variation, some of the water in the exhaust mixture is not routed back to form a portion of the oxidizer mixture, but rather is routed directed to the combustor. In such a steam injection variation, the exhaust mixture would not be modified from that described above. However, the oxidizer mixture would tend to have a greater ratio of $CO_2$ to water within the oxidizer mixture after diversion of a portion of the water/steam to the combustor. Where it is desirable to have the oxidizer mixture mimic the characteristics and performance of air, it would be generally desirable to increase a ratio of reactant portion (oxygen) to diluent portion (carbon dioxide and water) to compensate for the lesser amount of water in the oxidizer mixture where the steam injection variation of this invention is utilized.

In use and operation, and with particular reference to FIGS. 1 and 2, details of the retrofitting of a combined cycle gas turbine power system 10 with components to make it into the semi-closed combined cycle power system 100 of this invention are described. The semi-closed power system 100 of this invention can of course be constructed originally from separate components as shown in FIG. 2. However, the power system 100 utilizes each of the major components of a combined cycle gas turbine 10 so that retrofitting of the combined cycle gas turbine 10 can be accomplished without replacement or modification of major components.

Specifically, the divider 110 is coupled to the existing exit 54 of the heat recovery steam generator 50 and configured so that the separation duct 130 and the condenser 140 extend from one portion of the divider 110 and the return duct 120 extends from another portion of the divider 110. The return duct 120 returns back to the inlet 22 of the compressor 20. The oxygen duct 150 is positioned so that it can add oxygen into the return duct 120 and mix the oxygen with the exhaust E' to form the gas mixture C' for use in the semi-closed power system 100. An air separation unit would typically also be provided, which would be coupled to the oxygen duct 150.

Hence, the combined cycle gas turbine 10 can be retrofitted into a semi-closed combined cycle power system 100 with zero emissions (or vise versa for emergency operation) by merely adding the divider 110 and return duct 120 to route the exhaust E' back to the compressor 20 and the inclusion of a relatively straightforward separation duct 130, condenser 140 and air separation unit for oxygen production. This ability to operate as a semi-closed cycle or an open cycle, in an emergency, provides the plant with a very high reliability factor against unscheduled shutdowns.

With particular reference to FIG. 3, the semi-closed Brayton cycle power system with steam injection 200 of this invention is described in detail. The steam injection power system 200 begins with each of the major components of the semi-closed power system 100 (FIG. 2) described in detail above. However, for the steam injection power system 200, the semi-closed power system 100 is modified somewhat. Specifically, the heat recovery steam generator 50 is preferably not utilized to generate steam for a steam turbine and generator assembly 60, but rather is utilized to generator steam for injection into the combustor 30. Hence, the steam heating circuit 56, steam turbine and generator assembly 60 and working fluid pathway 62 are removed from the semi-closed power system 100 (FIG. 2) when the system 100 is modified to operate as the steam injection power system 200 (FIG. 3).

Additionally, the return duct 120 is modified to include a partial condenser 210 therein. The partial condenser 210 is preferably interposed within the return duct 120 so that all of the exhaust E' passes into the partial condenser 210. The partial condenser 210 includes a cooling fluid circuit 212 which passes through the partial condenser 210 in a heat exchange relationship so that a portion of the steam within the exhaust E' is caused to condense within the partial condenser 210. The cooling fluid within the cooling fluid circuit 212 could be any appropriate fluid, but would typically be water or possibly air.

Lower surfaces of the partial condenser 210 include a condensate outlet 214. The condensate outlet 214 leads to a water return line 216. This water return line 216 is routed back toward the heat recovery steam generator 50. The water within the water return line 216 is pumped up to combustor inlet pressure with a pump 220.

A high pressure water line 217 exits the pump 220 and passes through the heat recovery steam generator as the steam generation circuit 255. This steam generation circuit 255 outputs steam along steam injection line 218. This steam is then injected into the combustor 30 at the steam injection port 233.

The steam can in fact be introduced at a variety of locations upstream from the turbine 40 or within the turbine 40. For instance, the steam can be mixed with the compressed gas mixture exiting the compressor 20 before this gas mixture enters the combustor 30 at the oxidizer port 34. The steam could also, or alternatively, be mixed with fuel entering the combustor 30 at the fuel port 32. It is also possible that the steam could enter the combustor 30 within a combustion chamber area where maximum temperatures are achieved and cooling associated with the steam injection would preserve hardware within the combustor 30. The steam can alternatively be introduced downstream from the combustor 30 or at an intermediate stage within the turbine 40.

While the partial condenser 210 is preferably within the return duct 120, it is also conceivable that the return duct 120 would be split into two pathways with one of the pathways having all or part of the steam condensed therefrom and another of the pathways having no steam condensed therefrom. These two pathways would then be rejoined together with the same amount of water condensed from the exhaust E' as in the preferred embodiment identified above.

The steam injection power system 200 alters the make-up of the exhaust E' due to the partial condensation of steam within the exhaust E' while it flows through the return duct 120. Specifically, the exhaust E' enters the partial condenser 210 preferably made up of 55% wt $CO_2$ and 45% wt steam. A $C_2$-enriched exhaust E" exits the partial condenser 210 within the return duct 120. The amount of steam depletion from the exhaust E" depends on an amount of condensation occurring within the partial condenser 210. The $C_2$-enriched exhaust E" then reaches the oxygen duct 150 where oxygen is added to the $C_2$-enriched exhaust E". A gas mixture C' results which has a greater amount of $CO_2$ and oxygen and a lesser amount of steam when compared to the gas mixture C of the previous embodiment (FIG. 2). An example of this gas mixture C', which is the preferred mixture for the steam injection power system 200, among numerous possible mixtures, is provided in example 2 which follows.

EXAMPLE 2.

In this example, a little over half of the steam is condensed within the partial condenser 210. Specifically, the $CO_2$-enriched exhaust E" exiting the partial condenser 210 includes 79% wt $CO_2$ and 21% wt steam. Oxygen is supplied by the oxygen duct 150 at a ratio to the $CO_2$-enriched exhaust E" to produce the gas mixture C' including 63% wt $CO_2$, 17% wt steam and 20% wt oxygen. This gas mixture C' has air mimicking attributes similar to those of the gas mixture C of the previous embodiment (FIG. 2). Hence, the compressor 20 can compress the gas mixture C' while operating within its design parameters for the compression of air A (FIG. 1).

Note that the gas mixture C' includes 20% wt oxygen which is approximately the amount of oxygen within air A. This gas mixture C' can be utilized as the oxidizer within the combustor with an amount of fuel similar to that utilized when the combustor 30 is burning the fuel, such as natural gas or methane, in air A (FIG. 1). In such a scenario, excess oxygen is typically present after full combustion of the fuel. This excess oxygen within the working fluid exiting the combustor 30 would pass through the turbine 40 and be expanded along with other constituents of the exhaust E'.

The excess oxygen would then travel along with the exhaust through the divider 110 where a portion of the excess oxygen would pass through the separation duct 130 and into the condenser 140. Such excess oxygen would exit the condenser 140 through the gas outlet 142. The excess oxygen could then be readily separated from the $CO_2$ and returned to the oxygen duct 150 for reuse. The remaining oxygen within the exhaust E' would pass through the divider 110 and on to the return duct 120. It would then pass through the partial condenser 210 and be routed back to the compressor 30. Hence, in such an excess oxygen operation embodiment, a significant amount of oxygen would remain within the exhaust E' (i.e. the exhaust E' could have up to 10% wt oxygen) and $CO_2$-enriched exhaust E" such that less oxygen would need to be supplied from the oxygen duct 150 to create the gas mixture C' at the desired 63% wt $CO_2$, 17% wt steam and 20% wt oxygen constituency.

Preferably however, when the gas mixture C' is provided with oxygen as 20% of the gas mixture C', a proportionately larger amount of fuel, such as natural gas, is utilized within the combustor 30 so that a stoichiometric or near stoichiometric ratio is still maintained between the oxygen in the gas mixture C' and the fuel. When such a stoichiometric ratio is maintained, no oxygen remains within the exhaust E'. A greater amount of products of combustion would be provided per unit of gas mixture C' than with the gas mixture C (FIG. 2).

This greater amount of combustion products would have its temperature controlled by the injection of the steam into the combustor 30 through the steam injection port 233. Hence, temperatures would not exceed the design parameters for the combustor 30 and the turbine 40. Significantly larger amounts of exhaust E' exit the combustor and pass through the turbine 40 per unit of gas mixture C', such that acteristics of air are compared to three different gas mixtures including the gas mixture C (FIG. 2), the gas mixture C' (FIG. 3) and an intermediate gas mixture with gas constituencies within this intermediate gas mixture being approximately an average between the gas mixture C and the gas mixture C'. This intermediate gas mixture illustrates how numerous different gas mixtures can be formulated which vary between the specific gas mixtures C and C' disclosed in detail above, while still mimicking closely the characteristics of air. This intermediate gas mixture is considered to be particularly desirable for use in compressors which are sensitive to small changes in gas characteristics, in that the intermediate gas mixture more closely mimics the characteristics of air.

TABLE 2

| Parameter | Gas Mixture[1] | Gas Mixture[2] | Gas Mixture[3] | Air |
|---|---|---|---|---|
| Gas Constant - R, ft/° F. | 56.6 | 51.5 | 45.7 | 53.3 |
| Specific Heat - Btu/lb ° F. | 0.336 | 0.309 | 0.279 | 0.250 |
| Specific Heat Ratio ($\gamma$) | 1.28 | 1.27 | 1.27 | 1.38 |
| Typical Pressure Ratio | 30 | 30 | 30 | 30 |
| Inlet Temperature ($T_1$), ° F. | 200 | 180 | 160 | 80 |
| Outlet Temperature ($T_2$), ° F.[4] | 1058 | 979 | 934 | 1065 |
| Inlet Pressure ($P_1$), psia | 17.4 | 16.1 | 14.9 | 14.7 |
| Outlet Pressure, psia | 522 | 483 | 447 | 441 |
| Inlet Density, lb/ft$^3$ | 0.0671 | 0.0703 | 0.0757 | 0.0735 |
| Outlet Density, lb/ft$^3$ | 0.875 | 0.939 | 1.010 | 0.781 |
| Weight Flow Ratio - (Inlet Cond)[5] | 1.00 | 1.00 | 1.00 | 1.00 |
| Speed Ratio, $N/N_{AIR}$[6] | 0.99 | 0.916 | 0.849 | 1.00 |

[1]Values for the gas mixture C from example 1 above including 13% oxygen, 39% steam and 48% CO2, calculated by adding known values for each gas constituent multiplied by its percentage of the gas mixture.
[2]Intermediate gas mixture including 16% oxygen, 28% steam and 56% carbon dioxide.
[3]Gas mixture C' from example 2 above, including 20% oxygen, 17% steam and 63% carbon dioxide.
[4]Compressor efficiency~85%.
[5]$P_1 * SQRT(\gamma RT_1) = CONSTANT$ (where R is the gas constant)
[6]$N/SQRT(\gamma RT_1) = CONSTANT$ the turbine 40 outputs more power through power output 48. Because additional fuel is also utilized to burn with the additional amount of oxygen within the gas mixture C', the overall efficiency of the steam injection power system 200, when compared to the semi-closed combined cycle power system 100 is only slightly increased, while the power output from the steam injection power system 200 is significantly increased.

While two steam injection embodiments have been disclosed which utilize the 20% oxygen gas mixture C', including an excess oxygen embodiment and a stoichiometric embodiment, it is understood that numerous different embodiments of the steam injection power system 200 could be utilized having varying degrees of excess oxygen ranging from the excess oxygen present when air is utilized in a typical prior art gas turbine combustor 30 to the stoichiometric embodiment disclosed hereinabove. Each of these embodiments would include 20% oxygen within the gas mixture C'.

It is also conceivable that the gas mixture C' could be further modified by condensing a greater or lesser amount of the exhaust E' and/or by adding more oxygen to the exhaust E". Hence, gas mixtures other than the gas mixture C' can result once the oxygen has been added to the $CO_2$ enriched exhaust E".

Table 2 provides a comparison of the twelve quantifiable gas parameters utilized in Table 1 above. In Table 2 char- Specifically, the exhaust mixture of the turbine, assuming no excess oxygen would typically have between about fifty percent and sixty percent $CO_2$ by weight and between forty percent and fifty percent $H_2O$ by weight. Most preferably, the exhaust mixture would be about fifty-five percent $CO_2$ and about forty-five percent $H_2O$. If the system operates with excess oxygen, these percentages would proportionately decrease.

The oxidizer mixture could be varied widely to accommodate direct steam injection (hence reducing a water vapor portion of the oxidizer mixture) and to provide excess oxygen or to provide better matching of air characteristics for optimal compressor performance. Overall by weight, the carbon dioxide could vary from about thirty percent or forty percent to seventy percent or eighty percent. The water vapor could vary from about ten percent or twenty percent to about forty-five percent or fifty percent. The oxygen could vary from about ten percent or fifteen percent to twenty-five percent or thirty percent. Narrower constituent ranges of about five percent or ten percent surrounding the optimal formulations cited as examples would tend to provide air mimicking characteristics and performance closer to the optimal formulations.

In use and operation, and with particular reference to FIGS. 1–3, details of the retrofitting of a combined cycle gas turbine power system 10 with components to make it into the semi-closed steam injection power system 200 of this invention are described. The semi-closed steam injection power system 200 of this invention can of course be constructed originally from separate components as shown in FIG. 3. However, the steam injection power system 200 utilizes each of the major components of a combined cycle gas turbine 10 (other than the steam turbine and generator assembly 60), so that retrofitting of the combined cycle gas turbine 10 can be accomplished in a straightforward manner.

Specifically, the divider 110 is coupled to the existing exit 54 of the heat recovery steam generator 50 and configured so that the separation duct 130 and the condenser 140 extend from one portion of the divider 110 and the return duct 120 extends from another portion of the divider 110. The return duct 120 includes a partial condenser 210 therein. The partial condenser 210 receives cooling fluid and causes a portion of the steam passing through the return duct 120 to be condensed into water which exits the partial condenser 210 along the condensate outlet 214 and water return line 216.

A pump 220 is provided so that the water can be pumped through the heat recovery steam generator 50. The steam turbine and generator assembly 60 of the combined cycle gas turbine power system 10 are removed and the steam heating circuit 56 within the heat recovery steam generator 50 is now utilized to generate steam with the water from the pump 220 and the partial condenser 210. Steam is delivered from the steam generation circuit 255 within the heat recovery steam generator 50 and directed to the steam injection port 233 of the combustor 30. Hence, the combustor 30 is modified appropriately to include this steam injection port 233. The return duct 120 returns the $CO_2$-enriched exhaust E" back to the inlet 22 of the compressor 20. The oxygen duct 150 adds oxygen into the return duct 120 to mix with the exhaust E" to form the gas mixture C'. An air separation unit would typically also be provided, which would be coupled to the oxygen duct 150.

If the combined cycle gas turbine power system 10 is already configured to be a steam injection power system, the combustor 30 will already include the appropriate steam injection port 233. In such a configuration, removal of the steam turbine and generator assembly 60 would not be required. Rather, the water return line 216 from the partial condenser 210 would merely be coupled to the feed water inlet of the combined cycle gas turbine power system 10. Hence, either a steam injection open Brayton cycle gas turbine or the combined cycle gas turbine 10 can be retrofitted into a semi-closed steam injection power system 200 with zero emissions.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified. No claim language other than that explicitly accompanied by the word "means" should be construed as intending to invoke interpretation of that language as "means plus function" language according to section 112 of Title 35 of the United States code.

What is claimed is:

1. A semi-closed Brayton cycle power generation system, comprising in combination:

a gas compressor having an inlet and an outlet;

a combustor downstream of said compressor, said combustor having a fuel port coupled to a source of fuel, an oxidizer port coupled to said compressor outlet and an outlet port for combustion products resulting from combustion of fuel from said source of fuel with oxidizer from said oxidizer port;

a turbine downstream of said combustor, said turbine having an input coupled to said combustor outlet port, an output for the combustion products entering said turbine at said input, and a power output;

a return duct downstream of said turbine, said return duct receiving at least a portion of the combustion products passing through said output of said turbine and extending to said inlet of said compressor;

a gaseous oxygen duct coupled to a source of oxygen and coupled to said return duct in a manner adding oxygen to the combustion products within said return duct;

said gaseous oxygen duct located upstream of said gas compressor, such that the oxygen from said gaseous oxygen duct enters said compressor inlet along with the combustion products;

wherein a divider is located at least partially upstream of said return duct and downstream of said turbine, said divider dividing a portion of the combustion products passing through said output of said turbine into a separation duct separate from said return duct;

wherein a condenser is located downstream of said separation duct, said condenser including a gas outlet and a condensate outlet; and wherein a gas outlet compressor is located downstream from said gas outlet of said condenser, said gas outlet compressor adapted to receive at least a portion of gases exiting said condenser through said gas outlet, said gas outlet compressor adapted to compress the gases passing thereinto to a pressure sufficient to inject the gases into a terrestrial formation taken from the group of terrestrial formations including: underground fissures, deep ocean locations and at least partially depleted oil wells.

2. A semi-closed Brayton cycle power generation system, comprising in combination:

a gas compressor having an inlet and an outlet;

a combustor downstream of said compressor, said combustor having a fuel port coupled to a source of fuel, an oxidizer port coupled to said compressor outlet and an outlet port for combustion products resulting from combustion of fuel from said source of fuel with oxidizer from said oxidizer port;

a turbine downstream of said combustor, said turbine having an input coupled to said combustor outlet port, an output for the combustion products entering said turbine at said input, and a power output;

a return duct downstream of said turbine, said return duct receiving at least a portion of the combustion products passing through said output of said turbine and extending to said inlet of said compressor;

a gaseous oxygen duct coupled to a source of oxygen and coupled to said return duct in a manner adding oxygen to the combustion products within said return duct;

said gaseous oxygen duct located upstream of said gas compressor, such that the oxygen from said gaseous oxygen duct enters said compressor inlet along with the combustion products;

wherein a divider is located at least partially upstream of said return duct and downstream of said turbine, said divider dividing a portion of the combustion products passing through said output of said turbine into a separation duct separate from said return duct;

wherein a condenser is located downstream of said separation duct, said condenser including a gas outlet and a condensate outlet; and wherein said gas outlet includes an oxygen separator therein which separates at least a portion of oxygen passing through said gas outlet from at least some of the other gases within said gas outlet, and an excess oxygen return path leading from said oxygen separator to a location upstream of said gas compressor, such that said oxidizer port of said combustor can have excess oxygen delivered into said combustor compared to an amount of the fuel entering said combustor through said fuel port and the excess oxygen can either return through said return duct to said oxidizer port or through said oxygen separator of said gas outlet of said condenser to said oxidizer port and at least some of the excess oxygen in said system can remain in said system.

3. A semi-closed Brayton cycle power generation system, comprising in combination:

a gas compressor having an inlet and an outlet;

a combustor downstream of said compressor, said combustor having a fuel port coupled to a source of fuel, an oxidizer port coupled to said compressor outlet and an outlet port for combustion products resulting from combustion of fuel from said source of fuel with oxidizer from said oxidizer port;

a turbine downstream of said combustor, said turbine having an input coupled to said combustor outlet port, an output for the combustion products entering said turbine at said input, and a power output;

a return duct downstream of said turbine, said return duct receiving at least a portion of the combustion products passing through said output of said turbine and extending to said inlet of said compressor;

a gaseous oxygen duct coupled to a source of oxygen and coupled to said return duct in a manner adding oxygen to the combustion products within said return duct;

said gaseous oxygen duct located upstream of said gas compressor, such that the oxygen from said gaseous oxygen duct enters said compressor inlet along with the combustion products;

wherein a divider is located at least partially upstream of said return duct and downstream of said turbine, said divider dividing a portion of the combustion products passing through said output of said turbine into a separation duct separate from said return duct;

wherein said divider includes a flow rate control valve on said separation duct controlling an amount of combustion products passing through said separation duct at said divider; and wherein said flow rate control valve is pressure sensitive to maintain pressure within said return duct slightly greater than the pressure of the surrounding atmosphere.

4. A semi-closed Brayton cycle power generation system, comprising in combination:

a gas compressor having an inlet and an outlet;

a combustor downstream of said compressor, said combustor having a fuel port coupled to a source of fuel, an oxidizer port coupled to said compressor outlet and an outlet port for combustion products resulting from combustion of fuel from said source of fuel with oxidizer from said oxidizer port;

a turbine downstream of said combustor, said turbine having an input coupled to said combustor outlet port, an output for the combustion products entering said turbine at said input, and a power output;

a partial condenser downstream of said turbine output and upstream of said gas compressor inlet, said partial condenser condensing at least a portion of a water constituent of the combustion products, said partial condenser having a condensed water outlet;

an injection line downstream of said condensed water outlet and upstream of said combustor, said injection line bypassing said gas compressor;

a gaseous oxygen duct coupled to a source of oxygen and a location upstream of said gas compressor, such that the oxygen from said gaseous oxygen duct enters the compressor inlet along with at least a portion of the combustion products passing through said partial condenser;

wherein a return duct extends between said combustion products output of said turbine and said inlet of said gas compressor, said return duct routing at least a portion of the combustion products passing through said output of said turbine back to said inlet of said gas compressor; and wherein said partial condenser is located parallel to and at least partially separate from said return duct, such that only a portion of the combustion products exiting said output of said turbine pass through said partial condenser before continuing on to said inlet of said gas compressor.

5. A semi-closed Brayton cycle power generation system, comprising in combination:

a gas compressor having an inlet and an outlet;

a combustor downstream of said compressor, said combustor having a fuel port coupled to a source of fuel, an oxidizer port coupled to said compressor outlet and an outlet port for combustion products resulting from combustion of fuel from said source of fuel with oxidizer from said oxidizer port;

a turbine downstream of said combustor, said turbine having an input coupled to said combustor outlet port, an output for the combustion products entering said turbine at said input, and a power output;

a partial condenser downstream of said turbine output and upstream of said gas compressor inlet, said partial condenser condensing at least a portion of a water constituent of the combustion products, said partial condenser having a condensed water outlet;

an injection line downstream of said condensed water outlet and upstream of said combustor, said injection line bypassing said gas compressor;

a gaseous oxygen duct coupled to a source of oxygen and a location upstream of said gas compressor, such that the oxygen from said gaseous oxygen duct enters the compressor inlet along with at least a portion of the combustion products passing through said partial condenser; and wherein said gaseous oxygen duct delivers at least a portion of the oxygen from said source of oxygen to a location upstream of said partial condenser.

6. A kit for modifying an open Brayton cycle gas turbine with steam injection so that it can be used in a semi-closed Brayton cycle power generation system, comprising in combination:

an open Brayton cycle gas turbine with steam injection including:

a gas compressor having an inlet and an outlet;

a combustor downstream of said compressor, said combustor having a fuel port coupled to a source of fuel, an oxidizer port coupled to said compressor outlet, a steam port coupled to a source of steam and an outlet port for combustion products resulting from combustion of fuel from said source of fuel with oxidizer from said oxidizer port; and a turbine downstream of said combustor, said turbine having an input coupled to said combustor outlet port, an output for the combustion products entering said turbine at said input, and a power output;

a return duct downstream of said turbine, said return duct receiving at least a portion of the combustion products passing through said output of said turbine and extending to said inlet of said compressor;

a gaseous oxygen duct coupled to a source of oxygen and coupled to said return duct in a manner adding oxygen to the combustion products within said return duct;

said gaseous oxygen duct located upstream of said gas compressor, such that the oxygen from said gaseous oxygen duct enters said compressor inlet along with at least a portion of the combustion Products from said turbine output;

wherein a partial condenser is located downstream of said combustion products output of said turbine, said partial condenser including a condensate water outlet, said condensate water outlet coupled to a water injection line leading to said steam port of said combustor along a path bypassing said gas compressor; and wherein a divider is located downstream of said combustion products output of said turbine, said divider including a separation duct diverting at least a portion of the combustion products exiting the output of the turbine away from said return duct, said separation duct leading to a condenser, said water injection line at least partially fed by water condensed from said condenser in said separation duct.

7. The kit of claim 6 wherein said partial condenser is adapted to condense only a portion of the water constituent of the combustion products entering said partial condenser.

8. The kit of claim 7 wherein said water injection line passes through a heat exchanger receiving heat from the combustion products exiting the output of said turbine with sufficient heat transfer to boil at least a portion of the water within said water injection line into steam.

9. The kit of claim 8 wherein said source of oxygen of said gaseous oxygen duct includes an air separation unit configured to separate at least a portion of oxygen out of air surrounding the system, said air separation unit receiving at least some power for separation of the oxygen from the air from said power output of said turbine.

* * * * *